(12) United States Patent
Baker

(10) Patent No.: US 7,891,059 B2
(45) Date of Patent: Feb. 22, 2011

(54) ROPE CLAMPING DEVICE

(76) Inventor: Mark Baker, 4998 Reynolds La., Birmingham, AL (US) 35242

( * ) Notice: Subject to any disclaimer, the term of this patent is extended or adjusted under 35 U.S.C. 154(b) by 0 days.

(21) Appl. No.: 12/412,078

(22) Filed: Mar. 26, 2009

(65) Prior Publication Data

US 2009/0265893 A1 Oct. 29, 2009

Related U.S. Application Data

(60) Provisional application No. 61/048,718, filed on Apr. 29, 2008.

(51) Int. Cl.
*F16G 11/14* (2006.01)

(52) U.S. Cl. .............. 24/115 L; 24/127; 24/115 R; 24/132 R; 24/329; 24/331; 24/332

(58) Field of Classification Search .............. 24/115 L, 24/329, 331, 332, 132 R, 115 R, 127; 242/384.7
See application file for complete search history.

(56) References Cited

U.S. PATENT DOCUMENTS

| | | | | |
|---|---|---|---|---|
| 426,731 A | * | 4/1890 | Metzler | 24/135 R |
| 593,256 A | * | 11/1897 | Velie | 24/134 R |
| 895,590 A | * | 8/1908 | Sprague | 24/18 |
| 1,956,903 A | * | 5/1934 | Kline | 114/199 |
| 3,564,664 A | * | 2/1971 | Dage | 24/134 R |
| 3,609,638 A | * | 9/1971 | Darrey | 439/369 |
| 4,039,020 A | * | 8/1977 | Jacobson | 160/178.2 |
| 4,077,094 A | | 3/1978 | Swager | |
| 4,097,023 A | * | 6/1978 | Muller | 254/391 |
| 4,103,871 A | | 8/1978 | Patterson et al. | |
| 4,236,281 A | | 12/1980 | Bottum | |
| 4,257,592 A | | 3/1981 | Jones | |
| 4,340,997 A | | 7/1982 | Voss | |
| 4,388,985 A | | 6/1983 | Fohl | |
| 4,706,345 A | | 11/1987 | Rockenfeller et al. | |
| 4,716,630 A | * | 1/1988 | Skyba | 24/134 R |
| 5,217,092 A | | 6/1993 | Potter | |
| 5,842,542 A | * | 12/1998 | Tien | 182/231 |
| 6,129,033 A | * | 10/2000 | Jarrell | 114/90 |
| 6,644,583 B2 | | 11/2003 | Schmidt | |
| 2005/0086771 A1 | * | 4/2005 | Buckley | 24/132 R |

* cited by examiner

*Primary Examiner*—Daniel P Stodola
*Assistant Examiner*—Rowland D Do
(74) *Attorney, Agent, or Firm*—Berenato & White, LLC

(57) ABSTRACT

The disclosure is directed to a rope clamping device, which is made up of the following elements: a central bar, two threaded bolts, two grooved wheels, two large clamps, eight metal washers, and four nuts. The device allows a rope, chain, or cable to pass over a grooved wheel, wherein the rope is held securely when a clamp is released onto the grooved wheel. There is a second clamp and grooved wheel on the opposing side of the device. When both clamps have engaged the rope, chain or cable, the loop of rope, chain or cable is held securely. This is done to serve as an alternative to traditional knot tying in order to quickly and easily secure an object with a rope, chain or cable.

4 Claims, 2 Drawing Sheets

ROPE CLAMPING DEVICE

This application claims the benefit of U.S. provisional application 61/048,718 filed Apr. 29, 2008.

BACKGROUND

1. Field of the Invention

The invention relates generally to a rope clamping device. More specifically the invention relates to a clamp equipped rope holding device wherein a rope length is looped around a pair of grooved wheels and held fast against each respect wheel by the clamp.

2. Description of the Prior Art

The prior art includes many and diverse mechanisms to retain lengths of rope. The most common and simple to perform rope is clamp is, obviously, a knot. The ability to tie a knot, however, is dependent on the knowledge of the person in question, and the relative flexibility, length, and purchase of rope that the individual has to work with. Where knots are not possible, or too slow to be useful, i.e., quick adjustment on sailing craft, various automatic spring biased single and double action cleating devices are available that use teeth to engage along a length of though-pulled rope. Rapid release is obtained by jerking the rope free of the opposed cleats. Buckles of various sorts are also used, especially in the climbing sports where rapid adjustment and controlled slipping action are necessitated. Other rope securing devices are merely protrusions of various design that fasten a length of rope to a surface (deck, wall, floor, railing, bulkhead, etc.).

However, the various rope securing devices already in use almost all require a slack to be introduced into the rope before release can be obtained. As such, re-adjustment of a taut rope is limited. In addition, many rope clamping and slipping devices are not easily manipulated by the unfamiliar or untrained, resulting in catastrophic failure or inoperability. Further, many rope clamps, as well as most knots, require a relatively high degree of digital dexterity and strength. This is something not all rope users may possess at a given moment, or in a given setting (i.e., a very cold ambient temperature, or when wearing protective gloves, etc.)

In view foregoing shortcomings in the known prior art, there is a need for a rope clamp that accommodates taut rope adjustment, includes ease of operation, regardless of the prior training, digital dexterity, or ability of the user.

SUMMARY OF THE INVENTION

The invention is a rope clamping device. The most basic version includes the following elements: a central bar element, two threaded bolts, two grooved wheels, two large clamps for encompassing the wheels, eight metal washers, and four nuts. The device allows a rope, chain, or cable to pass over a grooved wheel, wherein the rope is held securely when a clamp is released onto the grooved wheel. There is a second clamp and grooved wheel on the opposing side of the device. When both clamps have engaged the rope, chain or cable, the loop of rope, chain or cable is held securely. The device is easily manipulated, whether the rope is taut or slack, and whether the operator is wearing gloves, is cold, wet, etc.

The device is to be used in the following manner. One of the clamps is opened by the device user by squeezing the arms of the clamp with one hand. Using their free hand, the rope, chain or cable is inserted through the inside of the clamp and then wrapped one full revolution around the grooved wheel associated with the open clamp. The clamp is released by the user, and the rope, chain or cable is held securely to the grooved wheel by the clamp. The rope, chain or cable is looped through or around the desired object to be secured (i.e., pole, box, person, load, etc.) and returned back to the device with all of the desired slack taken out of the rope, chain or cable. The other clamp is opened by the device user squeezing the arms of the other clamp with their hand. The rope, chain or cable is wrapped one full revolution around the other grooved wheel, and the second clamp is released. With both clamps holding the rope, chain or cable firmly against the grooved wheels, a loop of rope, chain or cable is held securely.

The device can be scaled to be larger or smaller depending on the intended use and service condition. It is suitable for thread, fishing line, clothesline, intermediate rope, two rope, boating tie offs, load securing lines, cables, chains, etc.

DETAILED DESCRIPTION

The device is comprised of the following basic components: central bar (12), threaded bolt×2 (16a, 16b), grooved wheel×2 (14a, 14b), large clamp×2 (22a, 22b), washer×8 (20) and nut×4 (18).

Figure 1:
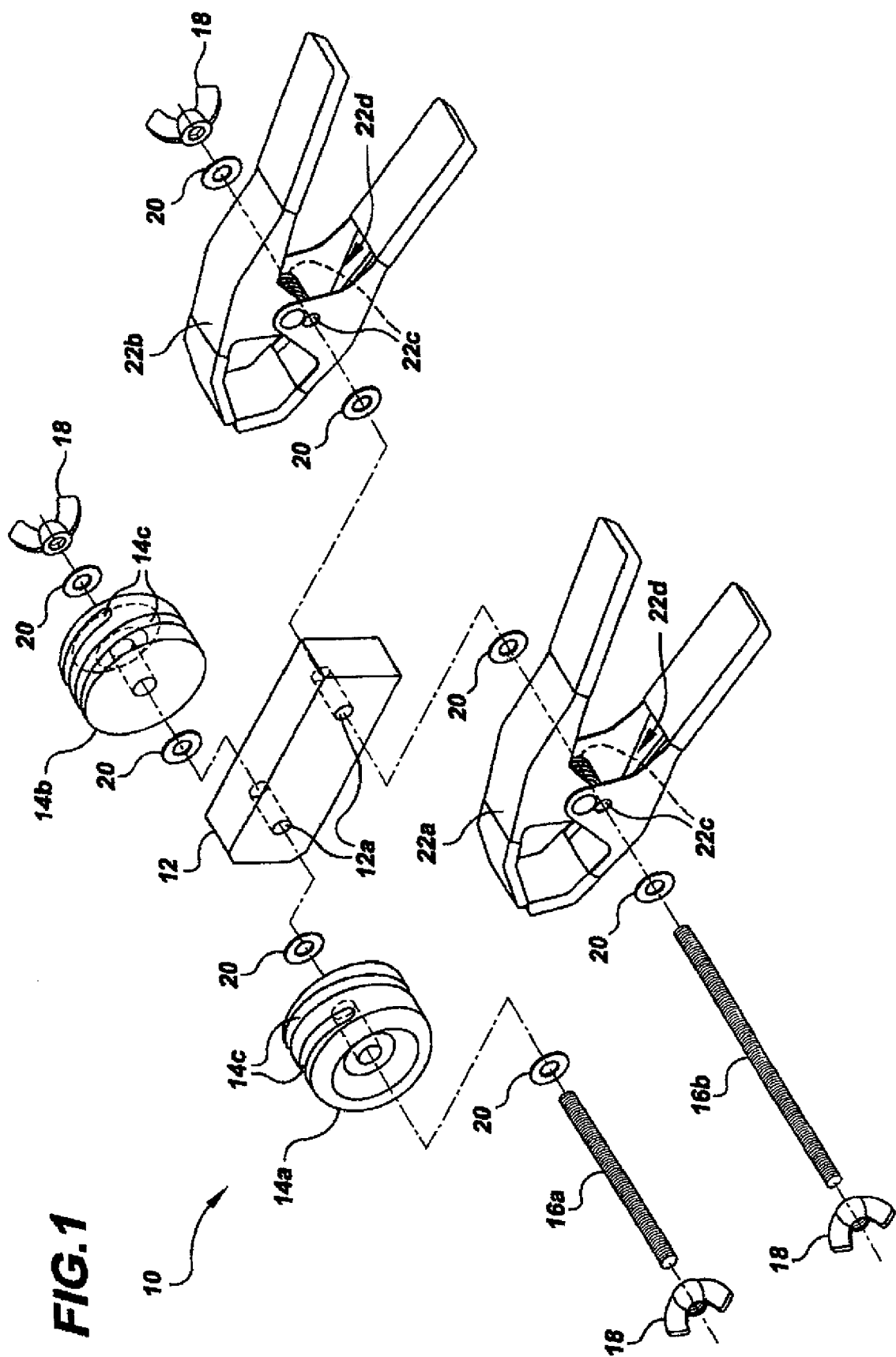
FIG. 1 is an exploded perspective view of the rope clamp in accord with the present invention.
Figure 2:
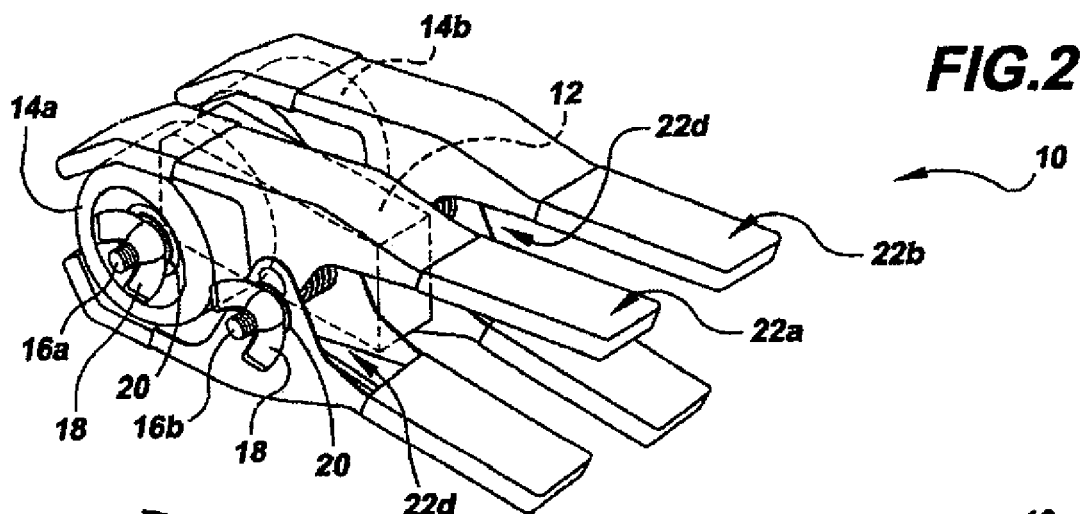
FIG. 2 is an assembled perspective view of the rope clamp.
Figure 3:
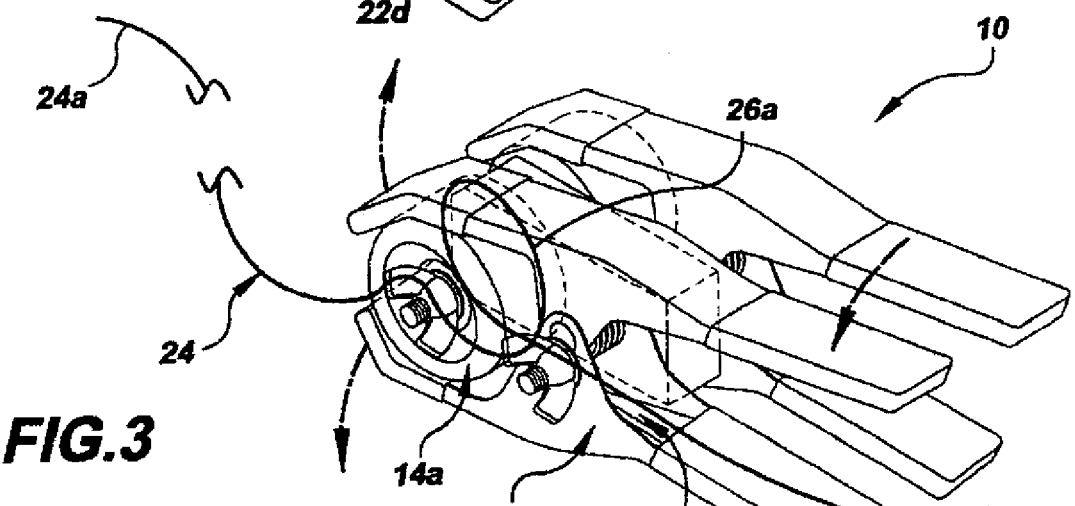
FIG. 3 is a perspective view of the invention showing first clamp opened and the end of rope passed through back end of clamp.
Figure 4:
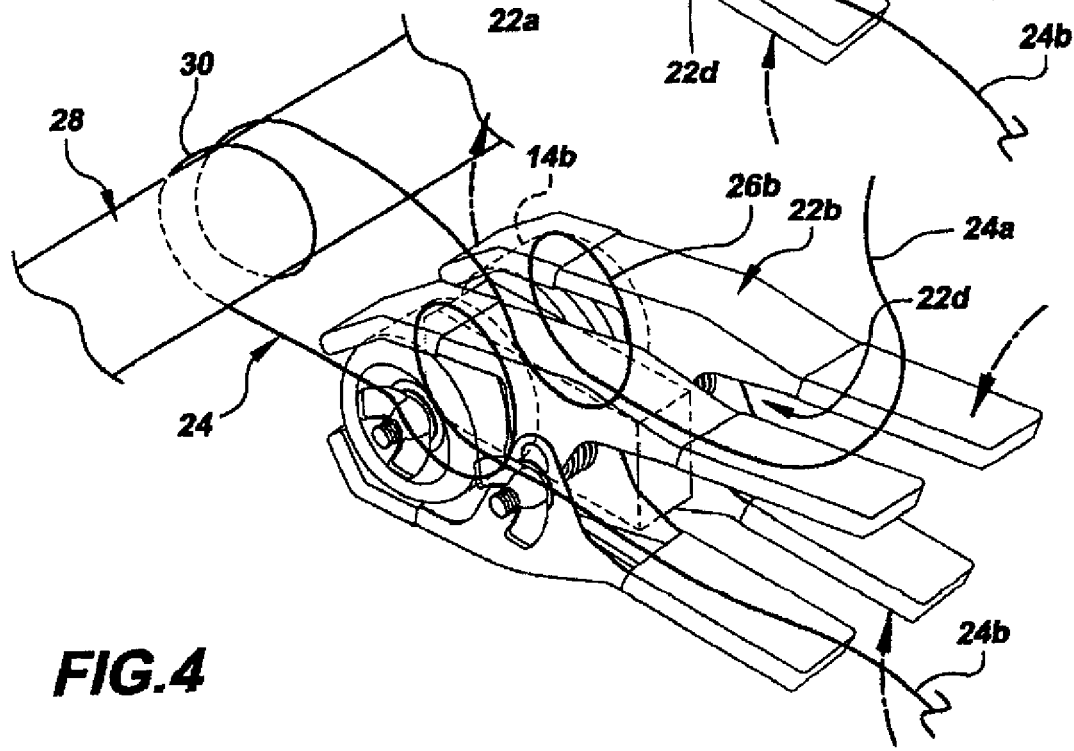
FIG. 4 is a perspective view of the invention 10 showing the rope looped around or through object to be secured and back to second clamp, which is opened and shown with an end of rope looped around the second grooved wheel and passed through the back end of second clamp.

FIG. 1 depicts an exploded perspective view of the device. The central bar (12) has two holes (12a) drilled through it, approximately 2.5 inches apart, to accommodate the two threaded bolts (16a & 16b). The central bar (12) serves to position and respectively orient the grooved wheels (14a & 14b) and clamps (22a & 22b) in proper spatial orientation. A threaded bolt (16a) is inserted through the central bar's forward hole. Two washers (20) are inserted on each side of the central bar over the threaded bolt. A grooved wheel (14a, b) is inserted over the threaded bolt on each side of the central bar. A washer (20) is inserted on each end of the threaded bolt (16a). A nut (18), preferably a winged nut, i.e., a wingnut, is fastened to each end of the threaded bolt to secure grooved wheels to the central bar.

The second threaded bolt (16b) is inserted into the other hole of the central bar. A washer (20) is inserted on each end of the threaded bolt. A clamp (22a, b) is inserted over the threaded bolt (16b) on each side of the central bar. Each clamp has a hole (22c) in one arm of the clamp, and the clamp's gripping end has been molded to better accommodate the outward shape of the grooved wheel. A washer (20) is inserted over each end of the threaded bolt (16b), and a nut (18) is threaded onto the threaded bolt to secure the clamps to the device. The central bar 12 and two threaded bolts 16 might also be constructed from a single piece of molded plastic or metal, a length of cross-drilled pipe, etc., depending on the intended service use of the clamp.

In operation, the first clamp (22a) is opened and the leading end (24a) of rope (24) is passed through the back end (22d) of the first clamp. The rope (24) is looped around first grooved wheel (14a) and first clamp (22a) is reengaged with first grooved wheel (14a) which then holds rope (24) in place. The leading end of rope (24) is then looped around or through object (28) and passed back to second clamp (22b) which is then opened. The leading end (24a) of rope (24) is then looped around the second grooved wheel (14b) and passed through the back end (22d) of second clamp (22b). The second clamp (22b) is reengaged with second grooved wheel (14b) and rope (24), which secures and holds the rope (24) and object (28) in place and with both clamps holding the rope (24) tight. The rope/chain/cable may be wrapped more than a single revolution around the respective grooved wheels.

The device shown can be made using components other than those shown and/or using differing combinations. For example, the nuts may incorporate washers, the threaded bars may include sleeves to aid rotation of the grooved wheels, etc. The grooved wheels may be made of various materials and/or include a different surface for the grooves, i.e., a rubber grooved outer-sleeve over a stainless wheel, entirely nylon, wood, etc. The clamps may include an additional clamping action feature, i.e., a threaded spreading device between the respective handles, to further supply clamping action to the grooved wheels in low friction settings (i.e., oil soaked or wet).

While the present invention has been described in terms of specific embodiments, it is to be understood that the invention is not limited to these described embodiments. This invention may be embodied in many different forms and should not be construed as limited to the embodiments set forth herein; rather, these embodiments are provided by way of illustration only and so that this disclosure will be thorough, complete and will fully convey the full scope of the invention to those skilled in the art. Indeed, many modifications and other embodiments of the invention will come to mind of those skilled in the art to which this invention pertains, and which are intended to be and are covered by both this disclosure, the drawings, and the claims.

The invention claimed is:

1. A rope clamping device clamping a length of rope therein, comprising:
   a bar element having a first axle member and a second axle member, each axle member having stubs protruding there from on opposed sides of said bar;
   a pair of grooved wheels, accepting and guiding a portion of said rope in said groove around an entire circumference of said respective grooved wheels, placed on opposed sides of said bar element onto the first axle member protruding stubs and respectively rotatably fastened thereto; and,
   a pair of clamping devices placed on opposed sides of said bar element and on to the protruding stubs of said second axle member and fastened thereto, such that respective clamping jaws of said clamping devices overlie and surround said respective pair of grooved wheels and clamp said rope, wrapped completely around a circumference of said respective grooved wheels, against said grooved wheels and prevent rotation of said grooved wheels.

2. A rope clamping device as in claim 1, wherein:
said clamping devices are spring biased to close onto said respective grooved wheels.

3. A rope clamping device as in claim 1, wherein:
washer elements are placed between said bar element and each of said respective clamps and wheels.

4. A rope clamping device as in claim 1, wherein:
fasteners for securing said respective wheels and clamping devices to said protruding axle members comprise wingnuts.

* * * * *